Nov. 20, 1962 — G. H. STRAM — 3,064,492
SPEED CHANGING MECHANISM
Filed Feb. 16, 1960 — 4 Sheets-Sheet 1

*INVENTOR.*
GEORGE H. STRAM
BY *Otto Moeller*
*Attorney*

Nov. 20, 1962

G. H. STRAM 3,064,492

SPEED CHANGING MECHANISM

Filed Feb. 16, 1960

INVENTOR.
GEORGE H. STRAM
BY Otto Moeller
attorney

Nov. 20, 1962 G. H. STRAM 3,064,492
SPEED CHANGING MECHANISM
Filed Feb. 16, 1960 4 Sheets-Sheet 3

INVENTOR.
GEORGE H. STRAM
BY Otto Moeller
attorney

Nov. 20, 1962   G. H. STRAM   3,064,492
SPEED CHANGING MECHANISM
Filed Feb. 16, 1960   4 Sheets-Sheet 4

INVENTOR.
GEORGE H. STRAM
BY Otto Moeller
Attorney

United States Patent Office 3,064,492
Patented Nov. 20, 1962

3,064,492
SPEED CHANGING MECHANISM
George H. Stram, Hellam, Pa., assignor to Capitol Products Corporation, Mechanicsburg, Pa., a corporation of Pennsylvania
Filed Feb. 16, 1960, Ser. No. 9,110
5 Claims. (Cl. 74—472)

This invention relates to change speed transmission means particularly adapted for use in a vertical mixer for operating the beater or mixing spindle at any selected one of a number of speeds for beating or mixing dough or other materials.

It is an object of the invention to provide a novel change speed transmission and operating means therefor that is simple and compact in construction, light in weight, that is readily and conveniently assembled, and that is less expensive than conventional transmissions that afford comparable results.

Another object of the invention is to provide a novel sliding gear change speed transmission for a vertical mixer including control lever means operative between predetermined positions for shifting the sliding gear means for operation of the transmission at selected speeds and means for locking the control lever means in selected speed position to prevent accidental shifting of the sliding gear means. More specifically, means is provided whereby the motive means for the transmission is operative only in the locked position of the control lever means.

Another object of the invention is to provide a novel four speed change speed transmission and control means therefor including a pair of speed changing control levers each controlling one of a pair of shiftable gear elements, means being provided for independently operating said control levers and for locking them in selected speed positions, and means also being provided whereby the motive means for the transmission is rendered inoperative when either of the control levers is released from said locking means.

The foregoing objects of the present invention, together with various other objects and advantages thereof which will become apparent, may be attained with the exemplary embodiment of the invention which is described in detail hereinafter and which is illustrated in the accompanying drawings.

Referring to the drawings.

Figure 1:
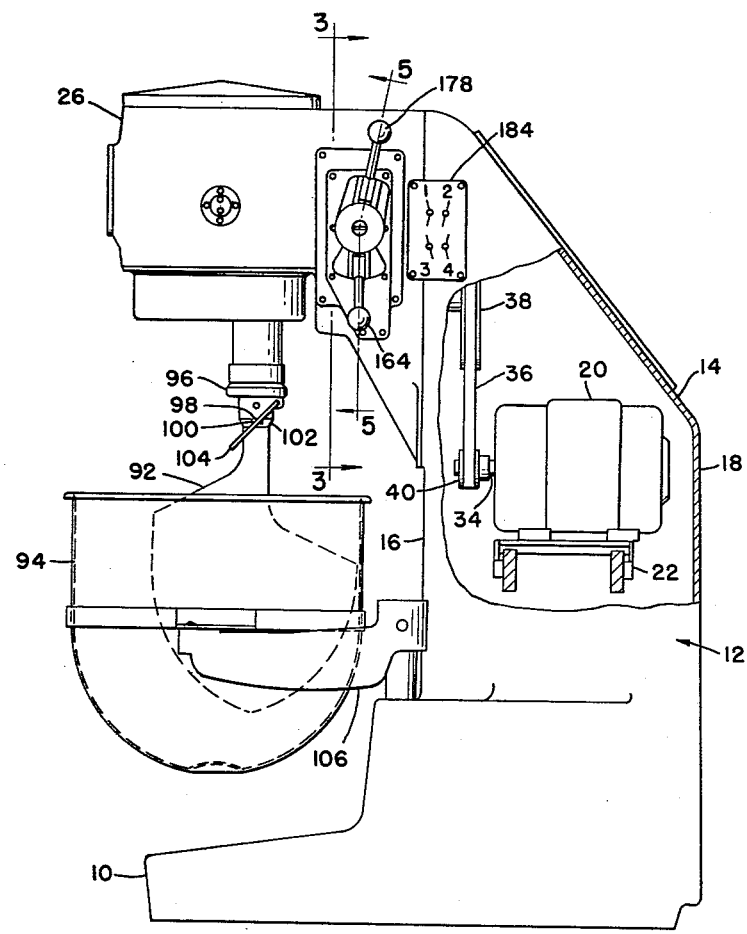
FIGURE 1 is a side elevation of a vertical mixer incorporating the invention, parts being broken away.

Referring particularly to FIGURE 1, the mixer comprises a hollow open bottom base 10, which may be made in the form of a metal casting. A hollow upright column 12, preferably substantially rectangular in cross section, is mounted on one end portion of the base 10 and may be advantageously cast integral therewith. The top wall 14 of column 12 slopes downwardly from the top of the forward wall 16 to the rearward wall 18 of the column 12 to give the mixer a streamlined and aesthetic appearance while at the same time affording a saving in metal and decrease in weight. A motor 20 is supported on a bracket 22 within the column 12.

Figure 2:
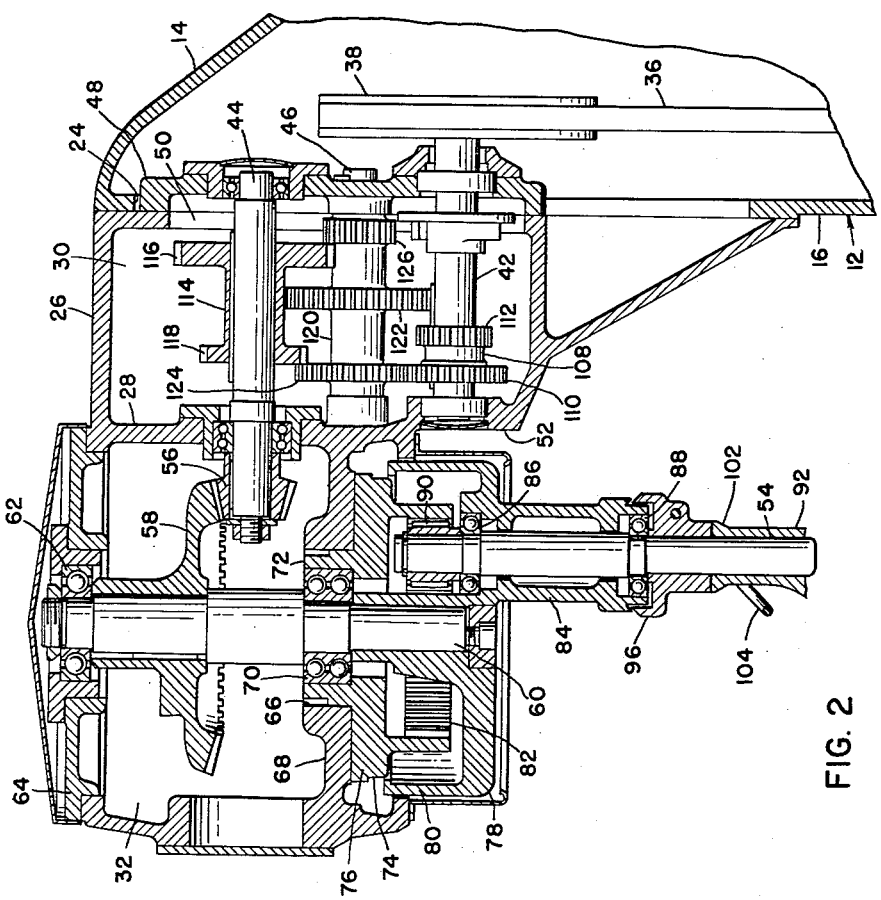
FIGURE 2 is a longitudinal vertical sectional view through the upper portion of the mixer.

The upper portion of the forward wall 16 of the column 12, as best shown in FIGURE 2, is formed with an opening 24 embraced by a transmission housing 26 that projects forwardly of the column 12 to overhang the base 10, suitable means, not shown, being provided for securing the housing 26 to the column 12.

The housing 26 is provided with a transversely extending web 28 to form a rear compartment 30 in which is mounted the speed changing mechanism of the transmission, and a front compartment 32 in which other components of the transmission are mounted.

Figure 3:
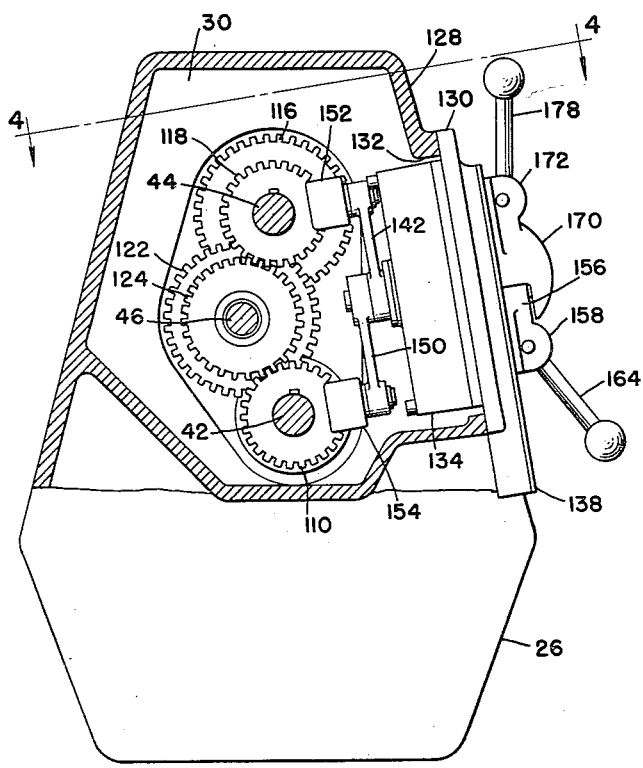
FIGURE 3 is a sectional view taken on line 3—3 of FIGURE 1.

Power is transmitted from the shaft 34 of the motor 20 to the transmission mechanism through a belt 36 running on grooved pulleys 38 and 40, the latter being secured to the motor shaft 34 and the former to a horizontal longitudinally extending shaft 42 disposed in the lower portion of the housing rear compartment 30. The shaft 42 constitutes the lower shaft of the speed changing mechanism, which includes also an upper shaft 44 and an intermediate shaft 46. The shafts 42, 44 and 46 are disposed in axial parallelism though offset vertically with respect to each other and also, as best shown in FIGURE 3, offset slightly transversely of each other.

The rearward ends of the shafts 42, 44 and 46 are rotatably mounted in suitable bearings carried by the removable cover 48 embracing the opening 50 in the rearward end of the transmission housing 26. The forward ends of the shafts 42 and 46 are rotatably mounted in suitable bearings carried by a front wall portion 52 of the rear compartment 30 of the transmission housing 26, while the forward end of the upper shaft is rotatably supported in and extends through a suitable bearing carried by the web 28.

The speed changing mechanism disposed in the rear compartment 30, hereinafter described in detail, is operatively connected with the beater shaft 54 through the transmission mechanism now to be described. Keyed on the end of the output shaft 44 of the speed changing mechanism that projects into the front compartment 32, is a bevel gear 56, which is in driving engagement with a bevel gear 58 secured to a vertical shaft 60. This shaft is supported at its upper end in a bearing 62 carried by a cover plate 64 for the open upper end of the front compartment 32. The shaft 60 projects through an opening 66 in the bottom wall 68 of the front compartment 32 and is supported in a bearing 70 carried by the sleeve portion 72 of an internal gear structure 74. The body portion 76 of the internal gear structure is removably secured in any suitable manner to the under surface of the compartment bottom wall 68, and the sleeve portion 72 carrying the bearing 70 extends into the opening 66 in the bottom wall 68 of the compartment 32.

A planetary head or beater shaft support structure 78 is carried on the lower extremity of vertical shaft 60 and is secured for rotation therewith in any suitable manner. The peripheral portion of the planetary head structure 78 is formed as an upstanding flange 80 disposed in spaced surrounding relation with respect to the ring gear portion 82 depending from the body portion 76 of the internal gear structure 74 to form an oil guard. The planetary head structure 78 has an eccentrically disposed downwardly projecting cylindrical sleeve 84, in the upper and lower ends of which are disposed bearings 86 and 88 for the reception of vertical beater shaft 54, the upper end of which carries a planet pinion 90 meshing with the internal ring gear 82. Thus, through the transmission mechanism, above described, the beater shaft 54 is adapted to rotate about its own axis as it revolves in an orbit about the axis of vertical shaft 60, imparting to the beater shaft a planetary movement.

The lower end of shaft 54 is adapted to support a beater 92 or other attachment that extends downwardly into the bowl 94. Any suitable means may be employed for detachably locking the beater 92 or other attachment to the shaft 54. For purpose of illustration, the lower end of shaft 54 has secured thereto a collar 96 provided with a downwardly projecting lug 98 adapted to be received in a notch 100 in a flange 102 provided at the upper end of the beater 92. Pivoted to the collar 96 is a U-shaped spring clip or bail 104, which is arranged to engage the flange 102 for supporting the beater 92 and which when swung upwardly on its pivot, disengages the flange 102 permitting the beater to be dropped or drawn off the lower end of shaft 54. Vertically adjustable bowl support means 106 is provided for raising the bowl in position for mixing the contents thereof, and lowering the bowl in position for removal from the mixer. The means for raising and lowering the bowl support 106 may be operated manually or by power means, and since it does not constitute a part of the present invention, it is not further described or illustrated in the drawings.

Reverting now to the speed changing mechanism, a double gear 108, including axially spaced large and small gears 110 and 112, is keyed on the lower shaft 42 for rotation therewith and for axial movement therealong. A double gear 114, including axially spaced large and small gears 116 and 118, is keyed on the upper shaft 44 for rotation therewith and for axial movement therealong. A triple gear 120, including axially spaced large, intermediate and small gears 122, 124 and 126, is fixedly mounted on the intermediate shaft 46 for rotation therewith.

Shifting mechanism, to be later described, is provided for axially moving the double gears 108 and 114 to different positions for varying the speed of the shaft 44. Thus, referring particularly to FIGURE 2, with double gears 108 and 114 shifted to the right to bring gears 112 and 122 in engagement and gears 116 and 126 in engagement, the shaft 44 is driven at the lowest or 1st speed. With double gear 108 in the position shown and double gear 114 shifted to the right, to bring gears 110 and 124 in engagement and gears 116 and 126 in engagement, the shaft 44 is driven at a faster or 2nd speed. With double gear 108 shifted to the right and double gear 114 shifted to the left, to bring gears 112 and 122 in engagement and gears 118 and 124 in engagement, the shaft 44 is driven at a still faster or 3rd speed. With double gear 108 in the position shown and double gear 114 shifted to the left, to bring gears 110 and 124 in engagement and gears 118 and 124 in engagement, the shaft 44 is driven at its highest or 4th speed.

The shifting means and the interlock means for starting and stopping the motor 20 is mounted in a side wall 128 of the rear compartment 30 of the transmission housing 126 at one side of the change speed gearing, as best shown in FIGURE 3. A flange 130 is secured in any suitable manner to the side wall 128, an upper portion of which embraces an opening 132 in side wall 128. Attached to a portion of the inner face of the flange 130 that overlaps the opening 132 is a dish shaped casing 134 that extends into the rear compartment 30 of the transmission housing 126 to form with the flange 130 a compartment 136. Removably secured to the outer face of the flange 130 is a cover plate 138.

Projecting centrally through the housing 136 is a hollow shaft 140 of an upper gear shift lever 142, the shaft 140 being rotatably supported in outer and inner bearings 144 and 146, the former being formed with the flange 130 and the latter with the casing 134. Rotatably mounted in the hollow shaft 140 and projecting beyond the ends thereof is a shaft 148 of a lower gear shift lever 150. The levers 142 and 150 extend from the inner projecting ends of their respective shafts 140 and 148 in opposed directions normal to the axes of their respective shafts. A yoke 152 is rotatably mounted in the free end of lever 142 and extends therefrom in a direction to freely receive a peripheral portion of the gear 118 of the double gear 114, whereby upon rotating hollow shaft 140, the double gear 114 is shifted axially along shaft 44. Similarly, a yoke 154 is rotatably mounted in the free end of lever 150 and extends therefrom in a direction to freely receive a peripheral portion of the gear 110 of the double gear 108, whereby upon rotating shaft 148, the double gear 108 is shifted axially along shaft 42.

The means for rotating the shaft 140 includes a hub 156 secured to the outer projecting end of the shaft 140 adjacent the cover plate 138. Depending from and formed with the hub 156 are a pair of spaced parallel ears 158 disposed in planes normal to the plane of the cover plate 138 and in which ears is mounted at pin 160, the axis of which is disposed at a right angle with respect to the axis of shaft 140. A collar 162 is mounted on the pin 160 between the ears 158 so that it is movable rotatably about the axis of pin 160, for a reason adverted to later in the description, but is restrained by the ears 158 against other movement relative to the hub 156. Threaded into a lower peripheral portion of the collar 162 and extending downwardly therefrom and outwardly from the plane of the cover plate 138 is a shifting handle 164. Thus, by turning the handle 164 in a counterclockwise direction from the position shown in FIGURE 1, the double gear 114 is moved to the left, as viewed in FIGURE 2, to bring gears 118 and 124 in engagement; while turning of the handle 164 in a clockwise direction moves the double gear 114 to the right, to bring gears 116 and 126 in engagement. In order to limit counterclockwise and clockwise movement of the handle 164 to positions wherein gears 118 and 124 engage and gears 116 and 126 engage, the collar 162 is provided with a lug 166 projecting through an arcuate slot 168 in the cover plate 138, the slot 168 being of such width as to limit movement of the lug 166 in the stated positions of the handle 164.

A similar arrangement is provided for shifting the double gear 108, including a hub 170 secured to the end of shaft 148 projecting from the outer end of hollow shaft 140. The hub 170 is provided with upwardly extending ears 172 between which, collar 174 is rotatably mounted on pin 176 carried by the ears 172. A handle 178 threaded into collar 174 is arranged to shift the double gear 108 in a manner similar to that by which double gear 114 is shifted by lower handle 164, as previously described. Movement of the upper handle 178 is limited to shift double gear 108 between a position wherein gear 110 meshes with gear 124 and a position wherein gear 112 meshes with gear 122, the means for limiting such movement of the handle 178 including the lug 110 of collar 174 which projects through arcuate slot 182 in the cover plate 138.

An indicator plate 184 is attached to the mixer at one side of the gear shifting handles 164 and 178 and their associated mechanism, as shown in FIGURE 1. The indicator plate 184 has indicia showing the position of the handles 164 and 178 for the four speeds of the mixer, so that by referring to the plate 184, the operator can swing the handles clockwise or counterclockwise, as viewed in FIGURE 1, to any one of the indicated positions for shifting the double gears 108 and 114 to obtain the desired speed.

Figure 5:
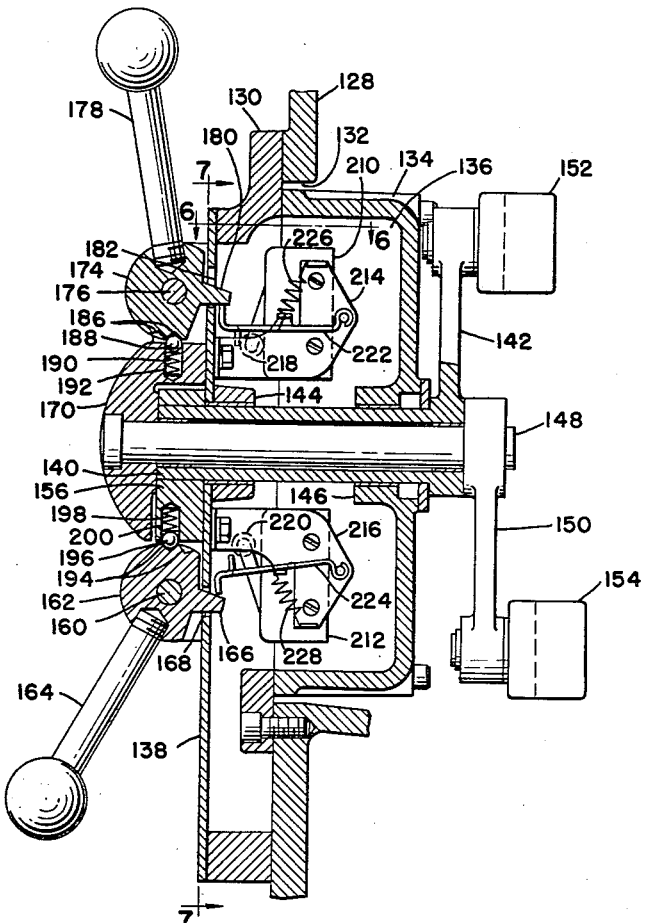
FIGURE 5 is a sectional view taken on line 5—5 of FIGURE 1.

As previously noted, collars 162 and 174 are mounted for rotation about the axes of their respective pins 160 and 176, so that handles 164 and 178 are pivotally movable in an arc toward and away from the plane of the cover plate 138, as best shown in FIGURE 5. Means are provided for yieldably retaining each of the handles in two positions, handle 178 being shown retained in its "in" position, while handle 164 is shown retained in its "out" position. This means includes a pair of notches 186 disposed in the periphery of the collar 174 opposite the handle 178, into which a ball 188 is yieldably urged by a spring 190 mounted in a bore 192 in the hub 170. Similarly, a pair of notches 194 in collar 162 are arranged to be engaged by a ball 196 which is yieldably urged in engagement with one or the other of the notches 194 by a spring 198 mounted in a bore 200 in the hub 162.

Figure 7:
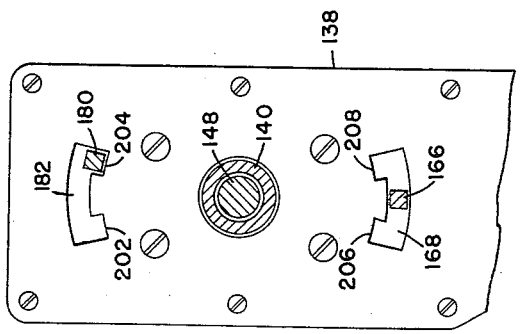
FIGURE 7 is a sectional view taken on line 7—7 of FIGURE 5.
Figure 4:
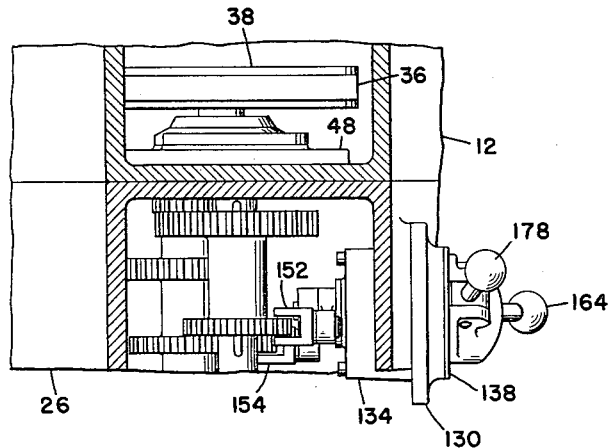
FIGURE 4 is a sectional view taken on line 4—4 of FIGURE 3.

As best shown in FIGURE 7, the arcuate slot 182 in the cover plate 138 is provided at its opposite ends with downwardly extending recesses 202 and 204. These recesses are arranged to be engaged by the lug 180 only when the handle 178 is pushed to its "in" position and when it is in one of its gear engaging positions, whereby accidental shifting of the double gear 108 is prevented. Thus, in order to shift double gear 108 the handle 178 must be pulled to its "out" position, in which position the lug 180 is disengaged from a recess 202 or 204 into alignment with the slot 182. Similarly, the arcuate slot 168 is provided at its opposite ends with upwardly extending recesses 206 and 208 for receiving the lug 166 when the handle 164 is pushed to its "in" position at one or the other of its gear engaging positions, whereby accidental shifting of double gear 114 is prevented.

A feature of the invention resides in the provision of means associated with the gear shifting handles 164 and 178 rendering the motor 20 inoperative when shifting either of the double gears 108 and 114 from one position to the other. This means includes a pair of micro switches 210 and 212 mounted in the compartment 136 on respective brackets 214 and 216 secured in any suitable manner to the inside surface of the cover plate 138. The switches 210 and 212 are normally open and are arranged to be held closed when the rollers 218 and 220 are engaged by the respective switch operating levers 222 and 224. The levers 222 and 224 are pivotally mounted to the free ends of their respective brackets 214 and 216, and extend therefrom toward the cover plate 138 to a position wherein they are adapted to be engaged by the lugs 180 and 166, respectively. Springs 226 and 228 attached at one end to respective brackets 214 and 216 and at their other ends to respective levers 222 and 224 normally retain the levers 222 and 224 out of engagement with the switch operating rollers 218 and 220.

Figure 8:
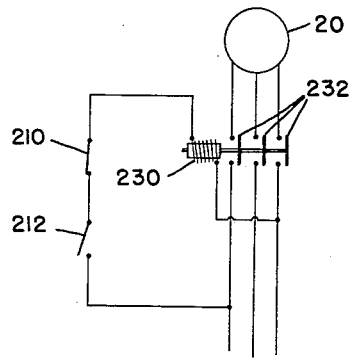
FIGURE 8 is a schematic view of an electrical circuit for the apparatus.
Figure 6:
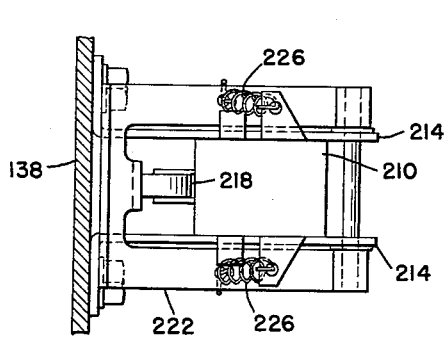
FIGURE 6 is a sectional view taken on line 6—6 of FIGURE 5.

The free ends of the levers 222 and 224 are so disposed as to be engaged by respective lugs 180 and 166 when respective handles 178 and 164 are moved to their "in" positions, and to be pivotally moved against the tension of respective springs 226 and 228 to engage respective rollers 218 and 220 to close switches 210 and 212. As shown in FIGURE 8, the normally open switches 210 and 212 are connected in series with the motor 20. It is evident, therefore, that the motor is inoperative when either of the handles 164 and 178 is moved to its "out" position to shift its respective double gear, thereby avoiding clashing of the gears.

Referring to the drawings and particularly to FIGURES 1, 2 and 5, should it be desired, for example, to operate the mixer in 1st or low speed, the handle 178 is pulled to its "out" position. This raises the lug 180 from engagement in recess 204 into arcuate slot 182, and the handle 178 can then be rotated in counterclockwise direction to the position shown on indicator plate 184 for 1st speed, whereupon double gear 108 is shifted from the position shown in FIGURE 2 to a position bringing gears 112 and 122 into engagement. The handle 178 is then pushed to its "in" position, whereupon lug 180 engages recess 202 and closes micro switch 210. The handle 164, which is shown in its "out" position, is then rotated in clockwise direction to the position shown on indicator plate 184 for 1st speed, whereupon double gear 114 is shifted from the position shown in FIGURE 2 to a position bringing gears 116 and 126 into engagement. The handle 164 is then pushed to its "in" position, whereupon lug 166 engages recess 206 and closes micro switch 212. With both switches 210 and 212 now closed, starter 230 is energized to close normally open switch 232 to render motor 20 operative.

Although I have disclosed an exemplary embodiment of my invention herein for purposes of illustration, it will be understood that various changes, modifications and substitutions may be incorporated in such embodiment without departing from the spirit of the invention as defined by the claims which follow.

I claim:

1. In combination, a gear casing, a change speed transmission in said gear casing including a shiftable speed changing gear element, a transversely extending rotatably mounted shift shaft projecting through a side wall portion of said gear casing, a connection between the inner end of said shift shaft and said gear element for shifting said gear element upon rotation of said shift shaft, a shift handle projecting laterally from the outer end of said shift shaft, connecting means between said handle and said shaft providing for rotation of said handle and shaft as a unit upon rotating said handle in a plane normal to the axis of said shaft for shifting said gear element, said connecting means providing for independent pivotal movement of said handle with respect to said shaft about an axis normal to the axis of said shaft, means for restricting rotational movement of said handle between two limiting positions for shifting said gear element between two predetermined limits including an arcuate slot in said casing side wall portion having defined opposed limiting ends, said arcuate slot being concentric with the axis of said shift shaft, and a projection on said handle extending into said slot and being movable between said opposed limiting ends thereof, and means for locking said handle in either of said limiting positions to prevent shifting of said gear element including a slot at each end of and communicating with said arcuate slot and extending radially therefrom with respect to the axis of said shaft, said handle projection being movable radially into either of said radial slots upon pivotal movement of said handle, said radial slots having defined radially spaced limiting ends selectively engageable by said handle projection to restrict pivotal movement of said handle between two limiting positions.

2. A combination in accordance with claim 1 including, a motor operatively connected with said transmission, a normally open switch in circuit with said motor, said switch being responsive to movement of said handle projection in either of said radial slots to one limiting end thereof to close the circuit to said motor and to movement therein to the other limiting end thereof to open the circuit to said motor.

3. In a vertical mixer having a transmission mounted in the mixer casing, said transmission including speed changing means including a pair of shiftable speed changing gear elements mounted in said casing, a housing in said casing at one side of said gear elements opening externally of said casing, a cover plate for said housing opening, a pair of shifting members including a pair of rotatably mounted shafts extending through and projecting from said housing, the inner projecting ends of said shafts each having a shifting lever for shifting a respective gear element upon rotation of said shafts, a shifting handle extending radially from each of the outer projecting ends of said shafts for rotating said shafts to shift said gear elements, a connection between said handles and said shafts providing pivotal movement of said handles about axes normal to the axes of said shafts, means for restricting rotation of said handles between two limiting positions for shifting said gear elements between two predetermined limits including a pair of arcuate slots in said housing cover plate each having defined opposed limiting ends, said arcuate slots each being concentric with the axis of a respective shaft, and a projection on each of said handles extending into a respective slot and being movable therein between said opposed limiting ends thereof, and means for retaining each of said handles in either of its limiting positions to prevent shifting of said gear elements including a slot at each end of and communicating with said arcuate slots and extending radially therefrom with respect to the axis of said shafts, said radial slots having defined radially spaced limiting ends, said handle projections being movable radially into said radial slots when alined therewith upon pivotal movement of said handles, the limiting ends of said radial slots cooperating with said handle projections to restrict pivotal movement of said handles between two limiting positions in one of which said handle projections are in coincidence with said arcuate slots to permit rotational movement of said handles and in the other of which said handle projections are out of coincidence with said arcuate slots to prevent rotational movement of said handles.

4. A combination in accordance with claim 3 including a motor operatively connected with said transmission, a pair of normally open series connected switches in said housing in circuit with said motor, each of said switches being engaged by a respective handle projection to close the circuit to said motor only when both handles are pivotally moved to their limiting position in which their handle projections are out of coincidence with their associated arcuate slots, and each of said switches being disengaged from a respective handle projection to open the circuit to said motor when either of said handles is pivotally moved to its limiting position in which its handle projection is in coincidence with its associated arcuate slot.

5. Speed changing means for a transmission including a pair of shiftable speed changing gear elements, a pair of shifting members including concentric rotatably mounted shifting shafts, a connection between each of said shifting shafts and a respective gear element for shifting the same upon rotation of its respective shifting shaft, a shifting handle projecting laterally from each of said shifting shafts, connecting means between each of said handles and its respective shifting shaft providing for rotation of each of said handles and its respective shifting shaft as a unit upon rotating said handles in a plane normal to the axes of said shafts for shifting said gear elements, said connecting means providing for independent pivotal movement of said handles with respect to their respective shifting shafts about axes normal to the axes of said shifting shafts, means cooperating with each of said handles in one pivotal position thereof for locking said handles against rotation thereof to restrain shifting of said gear elements, a motor operatively connected with said transmission, a pair of normally open series connected switches in circuit with said motor, each of said switches being responsive to pivotal movement of a respective handle to close the circuit to said motor only when both said handles are moved to locking position and being responsive pivotal movement of a respective handle to open the circuit to said motor when either of said handles is moved out of locking position.

References Cited in the file of this patent

UNITED STATES PATENTS

| | | |
|---|---|---|
| 702,346 | Day | June 10, 1902 |
| 1,527,247 | Bouillon | Feb. 24, 1925 |
| 1,563,546 | Bouillon | Dec. 1, 1925 |
| 2,548,337 | Barraco | Apr. 10, 1951 |
| 2,641,938 | Kylin | June 16, 1953 |
| 2,682,182 | Armitage | June 29, 1954 |
| 2,823,820 | Marchant | Feb. 18, 1958 |